United States Patent
Kamphenkel et al.

(10) Patent No.: US 9,122,578 B2
(45) Date of Patent: Sep. 1, 2015

(54) SOLID STATE MEMORY WITH REDUCED NUMBER OF PARTIALLY FILLED PAGES

(75) Inventors: Oliver Kamphenkel, Lehrte (DE); Michael Drexler, Gehrden (DE); Thomas Brune, Hannover (DE)

(73) Assignee: Thomson Licensing, Issy-les-Moulineaux (FR)

( * ) Notice: Subject to any disclaimer, the term of this patent is extended or adjusted under 35 U.S.C. 154(b) by 629 days.

(21) Appl. No.: 12/924,687

(22) Filed: Oct. 2, 2010

(65) Prior Publication Data

US 2011/0102636 A1    May 5, 2011

(30) Foreign Application Priority Data

Oct. 29, 2009 (EP) .................................. 09306027

(51) Int. Cl.
*G06F 12/02* (2006.01)

(52) U.S. Cl.
CPC .... *G06F 12/0246* (2013.01); *G06F 2212/1004* (2013.01); *G06F 2212/1016* (2013.01); *G06F 2212/1044* (2013.01); *G06F 2212/7203* (2013.01)

(58) Field of Classification Search
USPC .......................... 711/103, 154, 165–167, 170; 710/52–56; 365/185.33
See application file for complete search history.

(56) References Cited

U.S. PATENT DOCUMENTS

| | | | |
|---|---|---|---|
| 6,426,893 B1 | 7/2002 | Conley et al. | |
| 6,523,132 B1 | 2/2003 | Harara et al. | |
| 7,843,734 B2 | 11/2010 | Park et al. | |
| 2003/0046484 A1 | 3/2003 | Lasser | |
| 2005/0278480 A1 | 12/2005 | Watanabe et al. | |
| 2006/0136656 A1* | 6/2006 | Conley et al. | 711/103 |
| 2007/0061538 A1 | 3/2007 | Chang et al. | |
| 2007/0192530 A1* | 8/2007 | Pedersen et al. | 711/103 |
| 2007/0271494 A1 | 11/2007 | Gorobets | |
| 2008/0183949 A1* | 7/2008 | Ly et al. | 711/103 |
| 2008/0195804 A1* | 8/2008 | Kim et al. | 711/103 |
| 2008/0250195 A1* | 10/2008 | Chow et al. | 711/103 |
| 2009/0037652 A1 | 2/2009 | Yu et al. | |
| 2009/0172247 A1 | 7/2009 | Bar-Or et al. | |

FOREIGN PATENT DOCUMENTS

| | | |
|---|---|---|
| JP | 2007080475 | 3/2007 |
| JP | 2007305284 | 11/2007 |
| JP | 2009510656 | 6/2009 |
| WO | WO2007036047 | 5/2007 |

(Continued)

OTHER PUBLICATIONS

Article entitled "Open NAND Flash Interface Specification", ONFI, Open NAND Flash Interface, Feb. 27, 2008.
Search Report dated—Apr. 12, 2010.

(Continued)

*Primary Examiner* — Arpan P. Savla

(74) *Attorney, Agent, or Firm* — Myers Wolin LLC

(57) ABSTRACT

The invention concerns a solid state memory, comprising multiple logical units. The solid state memory contains an internal buffer for temporarily storing the incoming data steam before the incoming data are programmed to at least one page. The internal buffer keeps data that are not yet programmed in case a switch from one logical unit to another is performed. A method for operating such a device is presented.

12 Claims, 5 Drawing Sheets

(56) References Cited

FOREIGN PATENT DOCUMENTS

| WO | WO2009079014 | 6/2009 |
|---|---|---|
| WO | WO2009092152 | 7/2009 |

OTHER PUBLICATIONS

Butterfield et al., "Modelling flash memory: progress and scope", Jan. 1, 2005, pp. 1-14.

Anonymous, "Open NAND Flash Interface Specification", Open NAND Flash Interface Workshop, Amber Huffmann, Editor, Revision 2.0, Jan. 2008, pp. 156-197.

Anonymous, "NAND Flash Performance Increase with Program Page Mode Command", Micron Technical Note 29-14, 2005, pp. 1-8.

Zhan et al., "Interfacing ADSP-BF53x Blackfin Processors to NAND Flash Memory", Analog Devices Engineer-to-Engineer Notes EE-302, 2006, pp. 1-12.

\* cited by examiner

SOLID STATE MEMORY WITH REDUCED NUMBER OF PARTIALLY FILLED PAGES

This application claims the benefit, under 35 U.S.C. §119, of European Patent Application No. 09306027.5 filed 29 Oct. 2009.

FIELD OF THE INVENTION

The present invention concerns a solid state memory, for example being organized in targets, each target containing one or more logical units (LUN), each logical unit containing one or more blocks and each block containing one or more pages. Such a device is e.g. a NAND flash memory device, which is designed according to the Open NAND Flash Interface Specification (ONFI).

BACKGROUND OF THE INVENTION

Such devices are known from US patent publication US2008/0183949, which describes a method for programming a flash memory. Programming within this context is understood by a person skilled in the art as writing or storing bits in the flash memory cells. Programming data on a flash memory is done by programming data of one page at one time. If not enough data is provided at the end of the data stream to program a full page, the page programmed at the end of the data stream is only partially filled. If the data stream to be programmed continues later on, there is a partially filled page between other fully filled pages. This can be regarded as insufficient. A better solution is provided by reading out again the partially filled data page and completing the data with data later provided to be written and then programming a full data page to the flash memory. Partially filled pages are reduced at the cost of additional read and programming cycles.

US patent publication US2006/0136656 describes a block as the minimum erasable unit of a flash memory. It further describes the problem of partially filled pages which cannot be erased easily because the minimum erasable unit is not a page but a block. Thus, the flash memory is worn down unnecessarily.

The effect of partially filled pages also arises when a switching operation between two logical units is performed. When a switch from a first logical unit to a second logical unit is performed, the data left in an input buffer is programmed to the first logical unit and after that the switching to the second logical unit is made. If later on data are programmed to the first logical unit, a new page is used for programming the data and thus, partially used pages arise in the logical unit.

According to the Open NAND Flash Interface Specification (ONFI), writing data to a NAND Flash device is done by issuing a PROGRAM PAGE command with the corresponding logical unit number (LUN), block address and page address to the target. Afterwards data of a complete memory page, usually multiple kilobytes, is written to the page register of the selected logical unit. When a full page is written to the page register, the logical unit starts to program the data to its memory array. During programming, the logical unit is busy and the next page can be written to the logical units' page register after programming of the first page is finished. After a complete page has been written to the page register and the page program has been started, the other logical units of the target could be selected and used. The ONFI specification provides also a possibility to program partial pages, but that would implicate additional programming times and the reachable bandwidth would decrease.

The following programming instructions are defined according to the ONFI specification:

PAGE PROGRAM: Data is written to the data register and programming starts after the data phase has finished.

PAGE CACHE PROGRAM: Data is written to the data register and after the data phase is finished, the content of the data register is copied to the cache register and programming starts.

PAGE PROGRAM INTERLEAVED: Data is written to multiple data registers of one LUN and programming starts when the last data register is filled.

The known page program flow is used to write a complete data page to the page register of the NAND device and to start the programming to the memory array. Each procedure causes a number of state switches of the target state machine and the logical unit state machine. The state switches of the state machines in dependence of the procedure are shown below:

| Procedure | Target State Sequence | LUN State Sequence |
|---|---|---|
| Write Command 80h to NAND device | T_Idle -> T_Cmd_Decode -> T_PP_Execute -> T_PP_AddrWait | L_Idle |
| Write LUN-, block- and page-address to NAND device | T_PP_AddrWait -> T_PP_Addr -> T_PP_LUN_Execute -> T_PP_LUN_DataWait | L_Idle ->L_Idle_TargetRequest -> L_PP Execute -> L_PP_Addr -> L_PP_WaitForData |
| Write complete data page to NAND device | T_PP_LUN_DataWait -> T_PP_LUN_DataPass -> T_PP_LUN DataWait | L_PP_WaitForData -> L_PP_AcceptData -> L_PP_WaitForData |
| Write Command 10h to NAND device | T_PP_LUN_DataWait -> T_PP_Cmd_Pass -> T_Idle | L_PP_WaitForData -> L_PP_Prog -> L_PP_ProgWait -> L_PP_Sts -> L_Idle |

Interleaved operations enable to issue multiple commands of the same type to different blocks of the same logical unit. The known interleaved page program flow is used to write complete data pages to multiple independent page registers of a logical unit and to start the programming to the memory array when all registers are filled.

| Procedure | Target State Sequence | LUN State Sequence |
|---|---|---|
| Write Command 80h to NAND device | T_Idle -> T_Cmd_Decode -> T_PP_Execute -> T_PP_AddrWait | L_Idle |
| Write LUN-, block- and page-address to NAND device | T_PP_AddrWait -> T_PP_Addr -> T_PP_LUN_Execute -> T_PP_LUN_DataWait | L_Idle -> L_Idle_TargetRequest -> L_PP_Execute -> L_PP_Addr -> L_PP_WaitForData |
| Write complete data page to NAND device | T_PP_LUN_DataWait -> T_PP_LUN_DataPass -> T_PP_LUN_DataWait | L_PP_WaitForData -> L_PP_AcceptData -> L_PP_WaitForData |
| Write Command 11h to NAND device | T_PP_LUN_DataWait -> T_PP_Cmd_Pass -> T_PP_IlvWait | L_PP_WaitForData -> L_PP_Ilv -> L_PP_Ilv_Wait |
| Write Command 80h* to NAND device | T_PP_IlvWait -> T_PP_AddrWait | L_PP_Ilv_Wait |
| Write LUN-, block- and page-address to NAND device | T_PP_AddrWait -> T_PP_Addr -> T_PP_LUN_Execute -> T_PP_LUN_DataWait | L_PP_Ilv_Wait -> L_PP_Addr -> L_PP_WaitForData |

| Procedure | Target State Sequence | LUN State Sequence |
|---|---|---|
| Write complete data page to NAND device | T_PP_LUN_DataWait -> T_PP_LUN_DataPass -> T_PP_LUN_DataWait T_PP_LUN_DataWait -> T_PP_Cmd_Pass -> T_Idle | L_PP_WaitForData -> L_PP_AcceptData -> L_PP_WaitForData L_PP_WaitForData -> L_PP_Prog -> L_PP_ProgWait -> L_PP_Sts -> L_Idle |
| Write Command 10h to NAND device | | |

*The address cycles for the program operation of state 'T_PP_IlvWait' is intended to have a different interleaved block address than the one issued in the preceding program operation.

If data of two independent sources are recorded in independent LUNs of a target, one of the above described processes is first issued to the first LUN for the first independent source and after finishing the writing process, one of the above described processes is issued to the second LUN for writing the data of the second independent source to the second LUN.

When independent concurrent streams should be recorded to a flash device, it is advantageous to write the different streams to different logical units. The file management is easier with such a regular strategy and the full bandwidth of a logical unit is guaranteed for recording of an incoming data stream. If data of the streams arrive in blocks of smaller size than the page size, there is a need to cache data of each stream in a cache arranged outside of the flash device and to write it to the NAND Flash device, when a full page for one logical unit is ready to be programmed. Depending on the amount of streams and logical units, a lot of cache memory is needed outside the memory device, while the available page register inside the device remains unused.

SUMMARY OF THE INVENTION

It is an object of the invention to provide a solid state memory and a method for operating a solid state memory which reduces the problem of partially filled pages. It is a further object of the invention to provide a solid state memory and a method for operating a solid state memory which reduces the need for outside cache memory and which makes use of the internal page registers in case multiple incoming data streams are programmed to a flash device.

In order to use the page register of a logical unit as input buffer for the corresponding incoming data stream, an active logical unit has to be switched to dependent on the nature of the currently incoming stream, even if the pages on the other logical units can not yet be completely filled. The ONFI specification does not address this problem and does not provide a dedicated mechanism.

According to the invention, a solid state memory for storing at least one incoming data stream has multiple logical units within one target. Each logical unit has at least one page for programming data to the memory. The solid state memory contains an internal buffer memory, often called page register, for temporarily storing the incoming data stream before the incoming data are programmed to at least one page. Further, the internal buffer memory keeps data, which are not yet programmed, when a switching operation between different logical units is performed. This has the advantage that in the event of switching from a first logical unit to a second logical unit the remaining data, which is not yet enough to completely fill a page, does not need to be programmed but is kept in the page register. If later on, more data for this logical unit is provided, this data is added to the remaining data and the remaining data and the new data are programmed together as a full page. This enhances the overall bitrate for programming a specific logical unit because programming only partial pages is omitted. As programming of a full page and of a partial page needs almost the same time, less programming cycles are necessary for programming a specific amount of data in case care is taken to program only full pages in any possible case. Further, the problem of pages in the solid state memory device that are only partially filled with data in the solid state memory device is omitted. The solid state memory is more efficiently used.

Advantageously, the solid state memory is organized as groups of targets, wherein each target contains at least one logical unit. Each logical unit is provided with a page register for temporarily storing the incoming data to be programmed to this logical unit. Further, each logical unit contains at least one block. Erasing the memory is done blockwise. Each block contains at least one page. Data stored to be in one page is programmed at one time.

Preferably, each logical unit of the solid state memory has an internal buffer for temporarily storing the incoming data stream before the data is programmed to the pages. The size of the internal buffer is at least the size of one page plus the size of data received during the programming cycle of a page at highest allowable input bitrate. Thus:

$$Size_{internalBuffer} \geq Size_{Page} + Time_{PageProgramCycle} * Bitrate_{InputData}$$

This has the advantage that during programming of a page also the data for programming the next page can be received in the internal buffer. An internal buffer of the size of for example two pages can receive data for a whole page to be programmed during the programming cycle of another page, if the bitrate of the input data is high enough. Thus, the overall waiting times are reduced and the bitrate of the solid state memory is further enhanced.

Advantageously, the storage device is a NAND Flash device, which is operated according to the Open NAND Flash Interface (ONFI) specification. The ONFI specification does not foresee a specific algorithm to omit partially programmed pages if switching between different logical units is performed and to reduce programming times and thus programming bitrate in case of partial page programming. The proposed memory device has the advantage that it is essentially in accordance with the ONFI specification and omits partial pages at the same time. A device according to the invention deviates only from the known implementation of the ONFI standard. The program instructions of the ONFI standard are still used. The deviation from the implementation rules as known in the art is not in contradiction to the ONFI standard. Thus, a device according to the invention can still be regarded as being in compliance with the ONFI standard. Further, programming times are reduced because complete pages are programmed whenever appropriate. Besides that, the invention concerns a solid state storage device, which operates in a page oriented way and which is applicable for example for streaming applications, especially for streaming of several video sources in parallel, as central storage device for capturing measurement data of a research environment, especially for capturing of several measurement data streams in parallel or similar environments.

Preferably, the solid state memory is part of a video capturing camera system with one or more cameras. The data issued by the cameras are provided to the solid state memory device. Advantageously, the solid state memory stores data streams captured by different cameras in different logical units. Preferably, the camera system is provided for 3D video capturing. In this case several video streams, at least one of which is of high data rate are generated. That video data streams have to be stored in real time in parallel. The solid state memory provides several advantages for a camera system as described above. Storing the data streams of different cameras in different logical units has the advantage that an easy file structure is provided and the data are organized in accordance with the hierarchical memory structure. Thus, especially using a camera system with more than one camera, as it is for example mandatory for 3D capture, multiple data streams have to be stored at the same time. In addition, the data stream output by a camera has usually a high data rate. Using high definition cameras (HD), the data stream of one camera is for example up to 2 Gbits/s. The solid state storage according to the invention is especially advantageous for such systems, because the input data rate of the storage device is not unnecessarily reduced by writing and reading partially filled pages. A benefit is high in systems with multiple cameras, wherein data streams of different cameras are stored in different logical units, because switching between different logical units is done regularly in such systems and the problem of pages that are not written in one cycle or that are only partially written would arise frequently. Besides 3D capture, also multidimensional capture is in the focus of the film industry. The invention is also dedicated to scene captures of a multidimensional environment in real time.

Preferably, a method is implemented for operating a solid state storage device comprising at least one logical unit. Each logical unit comprises at least one page and a page being programmed at one time. In the method according to the invention, at least one incoming data stream is sequentially input into the solid state memory. The data is temporarily stored in an internal buffer, the page register. The internal buffer is for example a buffer as described above and allocated to a logical unit. A checking step is performed whether the internal buffer contains an amount of data that is sufficient for one complete page to be programmed. If the internal buffer contains sufficient data for one complete page to be programmed, at least one complete page is programmed. Sufficient data for one complete page may be just slightly more data than necessary for one complete page, but it may also be data that is sufficient to fill several complete pages. If a switching operation is performed between different logical units, not yet programmed data of the internal buffer of the logical unit that is currently active is kept in the internal buffer. The switching between the logical units is then performed. This has the advantage that before switching from a first logical unit to a second logical unit the remaining data which does not fill a complete page does not need to be programmed but is kept in the internal buffer and is still kept after switching is finished. If, later on, more data for this logical unit is provided, this data is added to the remaining data and the remaining data and the new data are programmed together as a full page. This reduces the overall programming time because programming of a partial page needs approximately the same processing time as programming a full page. Thus, by programming only full pages, the programming bandwidth is enhanced. Further, the problem of pages which are only partially filled with data during one programming cycle in the solid state memory device is omitted. The solid state memory is more efficiently used.

Advantageously, the method is used for storing the input data streams which are captured by different cameras in different logical units. Storing the data streams of different cameras in different logical units has the advantage that an easy file structure is provided and the data are organized in accordance with the hierarchical memory structure. Thus, especially using a camera system with more than one camera, as it is for example mandatory for 3D capture, multiple data streams have to be stored at the same time. In addition, the data stream output by a camera has usually a high data rate. Using high definition cameras (HD), the data stream of one camera is for example up to 2 Gbits/s. The provided solid state storage is especially advantageous for such systems, because the input data rate of the storage is not unnecessarily reduced by reading and writing partial pages. The benefit is high in systems with multiple cameras, wherein data streams of different cameras are stored in different logical units, because switching between different logical units is done regularly in such system and the problem of partial pages would arise often. Besides 3D capture, also multidimensional capture is in the focus of the film industry. The invention is also dedicated to scene captures of a multidimensional environment.

Preferably, the method operates according to the Open NAND Flash Interface (ONFI) specification. Advantageously, after data for one logical unit was received in a data register and in case a switch of the logical unit is to be performed, the target is set into state T_PP_Ilv_Wait using the Page Program Interleaved command 11$h$. Using this command, the logical unit is set into state L_PP_Ilv_Wait. Subsequently, the target is kept in state T_PP_Ilv_Wait and the logical unit is kept in state L_PP_Ilv_Wait until the data register of a LUN is filled with a full page. Then, these data are programmed to a page using the commands 10$h$ or 15$h$. Setting the target into state T_PP_LUN_DataWait and setting logical units into state L_PP_WaitForData after programming a full page to a logical unit using the commands 10$h$ or 15$h$ to prevent the target from deleting the data from the page register of the addressed logical unit.

BRIEF DESCRIPTION OF THE DRAWINGS

For better understanding the invention shall now be explained in more detail in the following description with reference to the figures. It is understood that the invention is not limited to these exemplary embodiments and that specified features can also expediently be combined and/or modified without departing from the scope of the present invention.

DETAILED DESCRIPTION OF PREFERRED EMBODIMENTS

Figure 1:
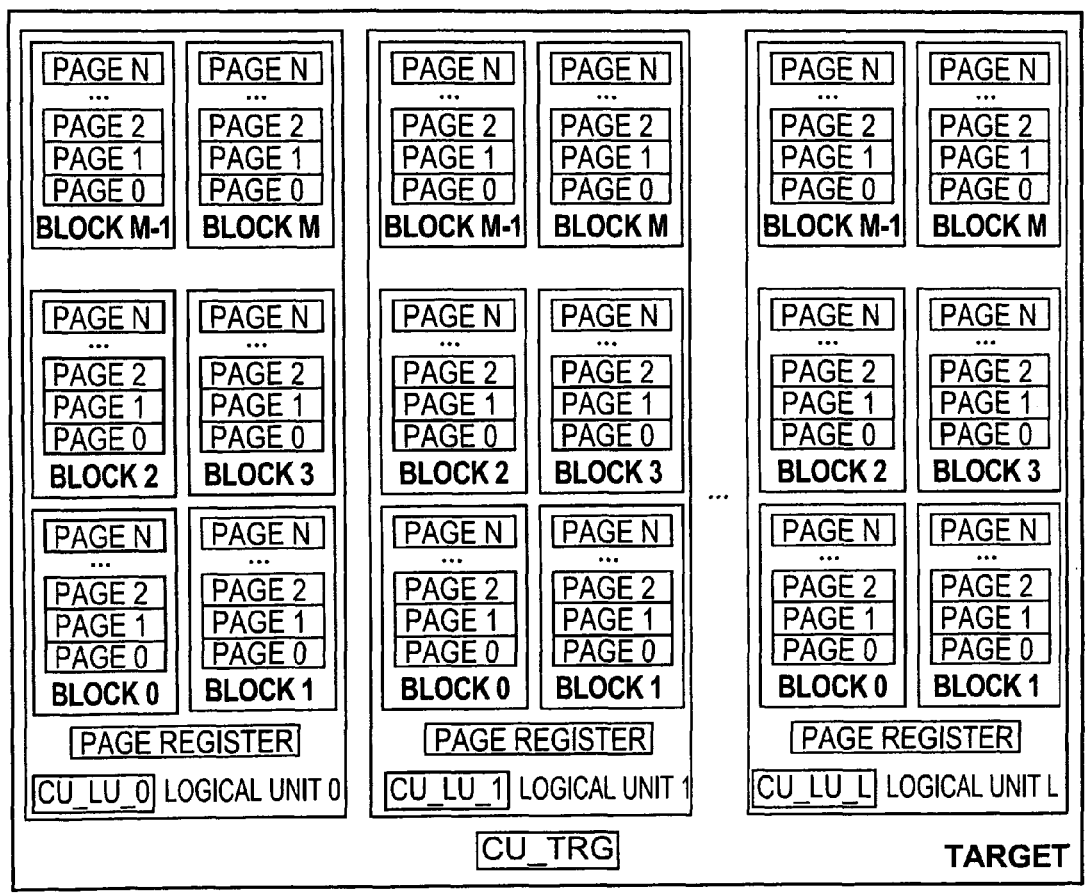
FIG. 1 depicts the hierarchical structure of a solid state memory device

FIG. 1 depicts a structure of a NAND flash memory, which is operated by the ONFI specification command set according to the invention. The NAND flash memory is organized as a target. A target contains one or multiple logical units LOGICAL UNIT 0, LOGICAL UNIT 1, . . . , LOGICAL UNIT L, each logical unit LOGICAL UNIT 0, LOGICAL UNIT 1, . . . , LOGICAL UNIT L contains multiple blocks BLOCK 0, BLOCK 1, . . . , BLOCK M and a block BLOCK 0, BLOCK 1, . . . , BLOCK M contains multiple pages PAGE 0, PAGE 1, . . . , PAGE N. A page PAGE 0, PAGE 1, . . . , PAGE N is typically a read or write unit. This means that a page contains the smallest number of data that can be read or written in one step. A block BLOCK 0, BLOCK 1, ..., BLOCK M is typically an erase unit. This means that a block contains the smallest number of data that can be erased in one step. A logical unit LOGICAL UNIT 0, LOGICAL UNIT 1, ..., LOGICAL UNIT L is an operating unit that operates independently. Each logical unit LOGICAL UNIT 0, LOGICAL UNIT 1, ..., LOGICAL UNIT L contains a page register PAGE REGISTER for temporarily storing data to be written or to be read. Further, each logical unit contains a controller unit CU_LU_0, CU_LU_1, ..., CU_LU_L for operating the logical unit LOGICAL UNIT 0, LOGICAL UNIT 1, ..., LOGICAL UNIT L. A target TARGET further contains a target control unit CU_TRG for controlling the device on a target level.

Figure 2:
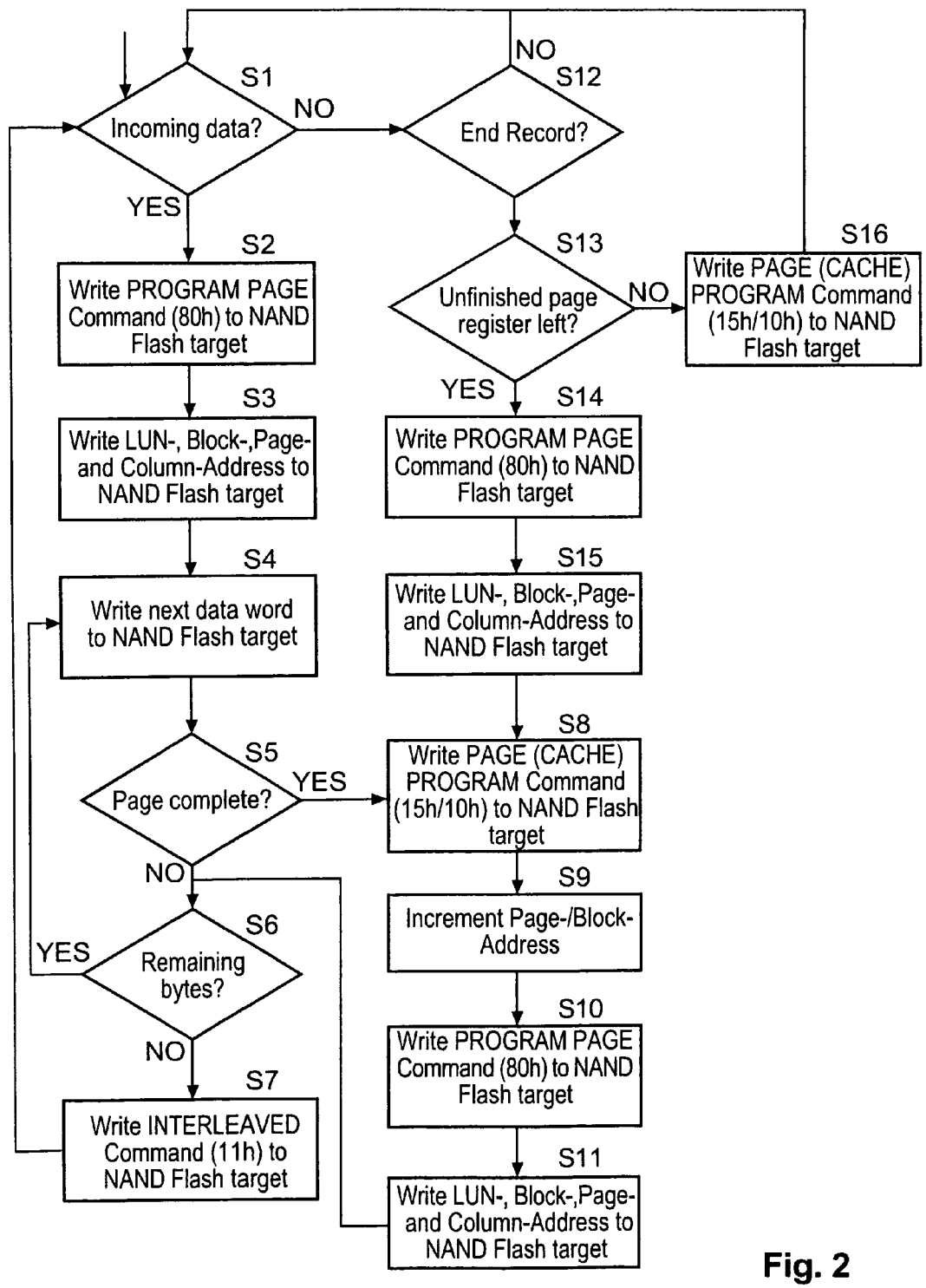
FIG. 2 depicts a method for operating a solid state memory device according to the invention

FIG. 2 depicts a program flow of a device according to the invention. In step S1 it is checked if incoming data is available.

If incoming data is available (YES), a page program command 80h is written to the target in step S2. In step S3 the LUN-, block-, page- and column address is written to the page register of the NAND flash target. In step S4, the next data word is written to the NAND flash target. Then, it is checked if a complete page is available in the page register of the flash target in step S5.

If a complete page is available (YES), in step S8 the data is stored in the respective page of the target using the page program 10h or page cache program 15h command. In step S9, the page- and block-addresses are incremented. Then, a further page program command 80h is written to the target in step S10. In step S11 the LUN-, block-, page- and column address is written to the page register of the NAND flash target.

Step 6 is performed if no complete page is available in step S5 (NO). Step 6 is also performed after step S11. In step 6 it is checked if there are remaining bytes available. If there are remaining bytes available (YES), the method proceeds with step S4. If there are no remaining bytes available (NO), an interleaved command 11h is written to the NAND in step 7 target and the method proceeds with step S1.

If no incoming data is available in step S1 (NO), it is checked if the end of the record is reached in step S12. If the end of the record is not reached (NO), the method further proceeds with step S1. If the end of the record is reached (YES), the method checks in step S13 if there are unfinished pages left in the register.

If there are unfinished pages in the register (YES), a page program 80h command is written to the NAND target in step S14 and the LUN-, block-, page- and column address is written to the NAND flash device in step S15. Then, the method further proceeds with step S8.

If no unfinished pages are left in the register in step S13 (NO), the method proceeds with storing the data in the respective page of the target using the page program 10h or page cache program 15h command in step S16. Then, the method restarts with step S1.

It is to be noted that storing data on a page in a logical unit using a page program command or a cache page program command requires two cycles. In the first cycle, both, page program and cache page program, are initiated using the 80h command. In the second cycle, the 10h command is issued for page program and the 15h command is issued for cache page program.

Figure 3:
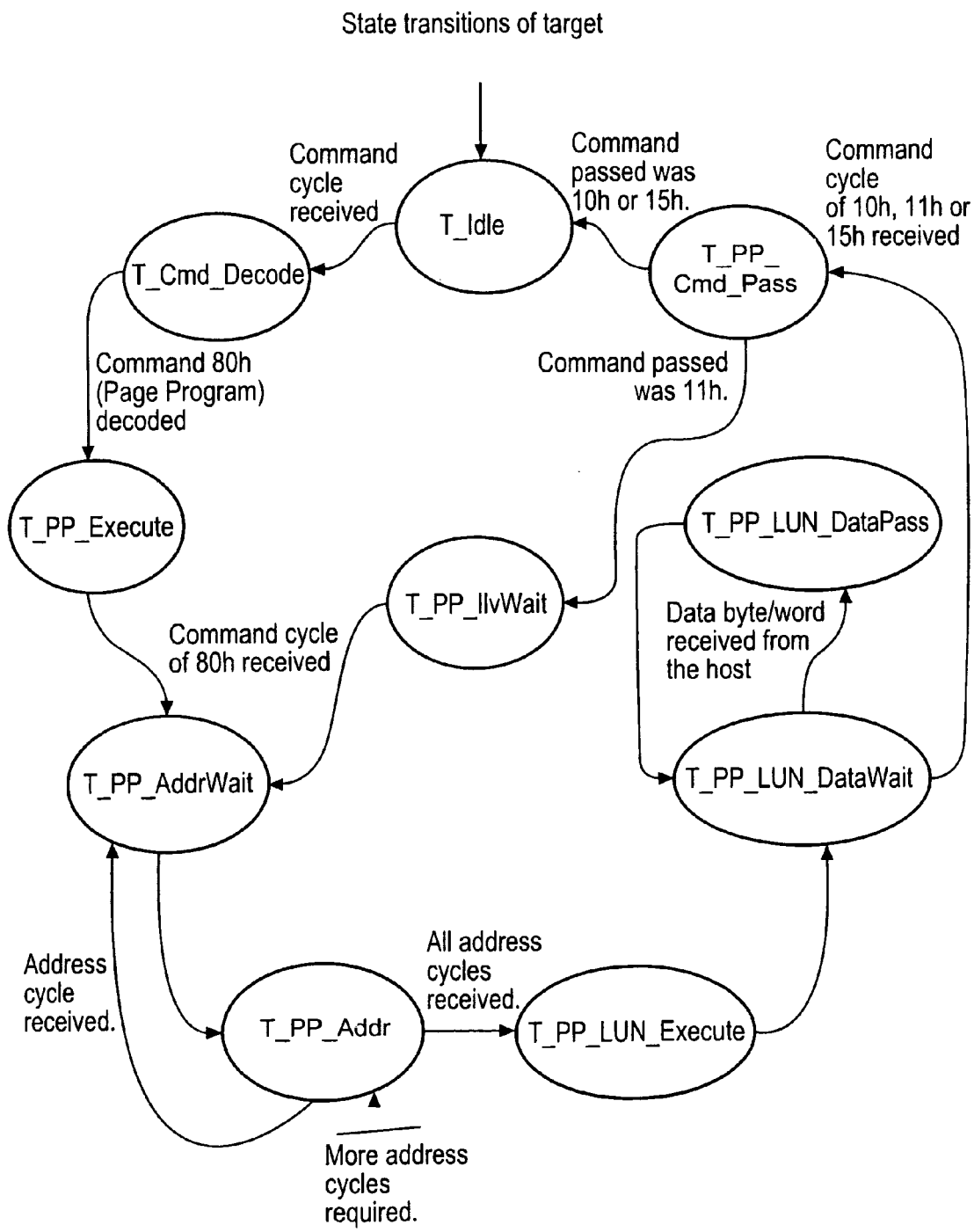
FIG. 3 depicts a state diagram of a target according to the invention

FIG. 3 depicts a target state diagram according to the invention. The target state diagram according to the invention considered separately corresponds to the target state diagram according to the ONFI standard. The initial state is T_Idle. After a command is received, the target decodes the received command in state T_Cmd_Decode. If the decoded command is a page program 80h command, the target switches to state T_PP_Execute. Then, the target sets tLastCmd to 80h. If R/B# is cleared to zero, then tbStatus78hReq is set to TRUE. In addition, all LUNs are requested to clear their page registers. Then, in state T_PP_AddrWait, the target waits for an address cycle. After an address cycle is received, the address cycle received is stored in state T_PP_Addr. If a further address cycle is required, the target switches to back to T_PP_AddrWait to receive the next address cycle. If no further address cycle is required, the target switches to state T_PP_LUN_Execute. The LUN indicated by the row address received is selected and the target issues the program to the LUN. Then the target waits for the data word or command cycle to be received from the host in state T_PP_LUN_DataWait and passes the data word to the selected LUN in state T_PP_LUN_DataPass. When a command is received in T_PP_LUN_DataWait, the target switches to state T_PP_Cmd_Pass. Then, the command is passed to the respective LUN. If the command is an 11h command, the target switches to state T_PP_IlvWait to wait for the next command to be issued. If this command is a page program 80h, the next byte is written to the LUN according to the above described method. On the other hand, if the command is a 10h or 15h command, the target returns back to the initial state T_Idle.

Figure 4:
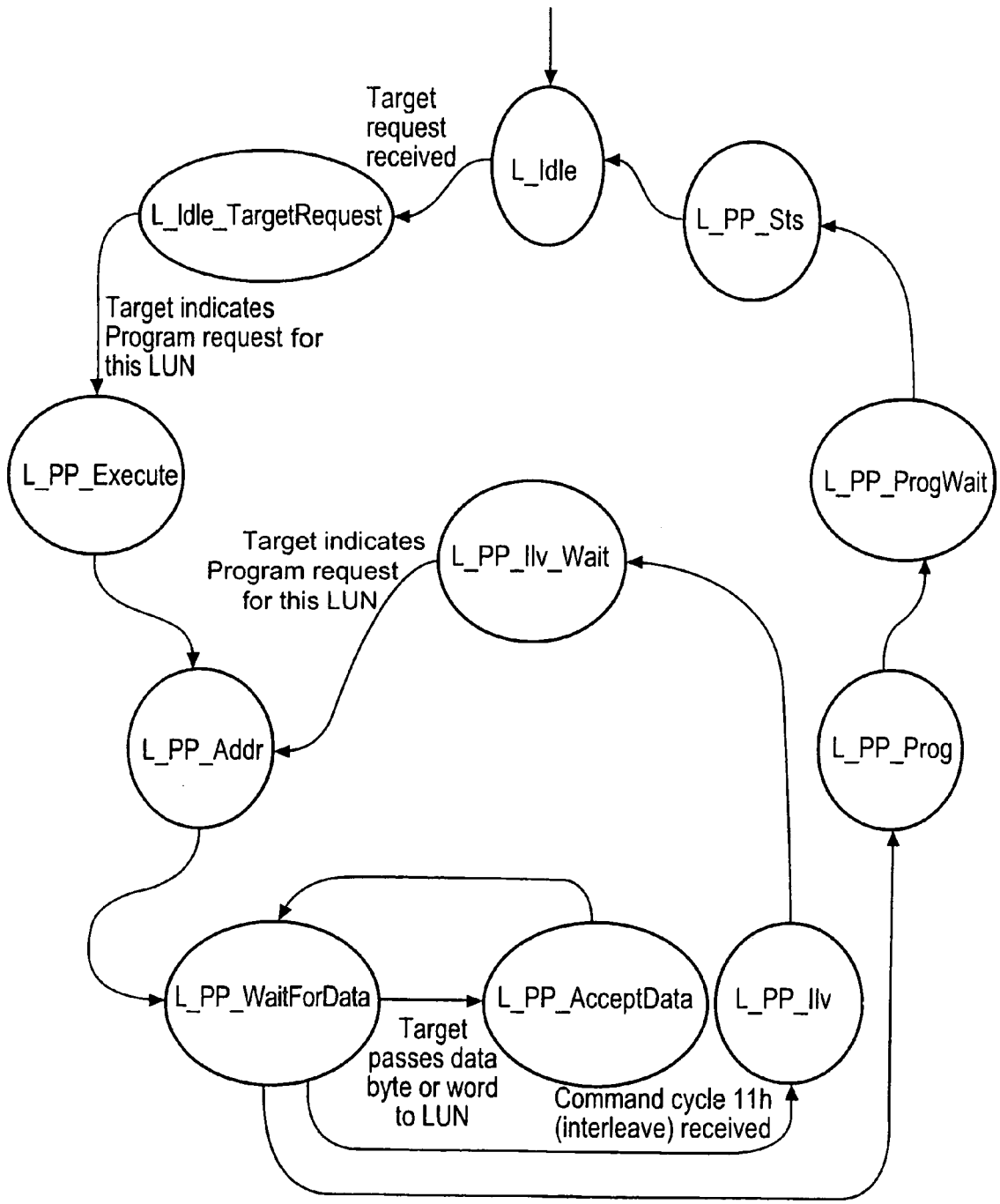
FIG. 4 depicts a state diagram of a logical unit according to the invention

FIG. 4 depicts a logical unit state diagram according to the invention. The logical unit state diagram according to the invention considered separately corresponds to the logical unit state diagram according to the ONFI standard. The initial state is L_Idle. After a target request is received for this LUN, the LUN switches to state L_Idle_TargetRequest and waits for the command issued by the target. If the target indicates a program request, the LUN switches to L_PP_Execute and then to L_PP_Addr to record the address received by the target. Further, the correct page register is selected based on the interleaved address and the column in the page register is selected according to the column address received. Then, the LUN receives the data passed by the target in the states L_PP_WaitForData and L_PP_AcceptData. In case the LUN then receives an 11h command, the LUN switches to state L_PP_IlvWait until the target requests a further program command for this LUN. In case the LUN receives a 10h or 15h command in state L_PP_WaitForData, the LUN switches to states L_PP_Prog, L_PP_ProgWait and L_PP_Sts and programs the respective data to the respective pages.

Figure 5:
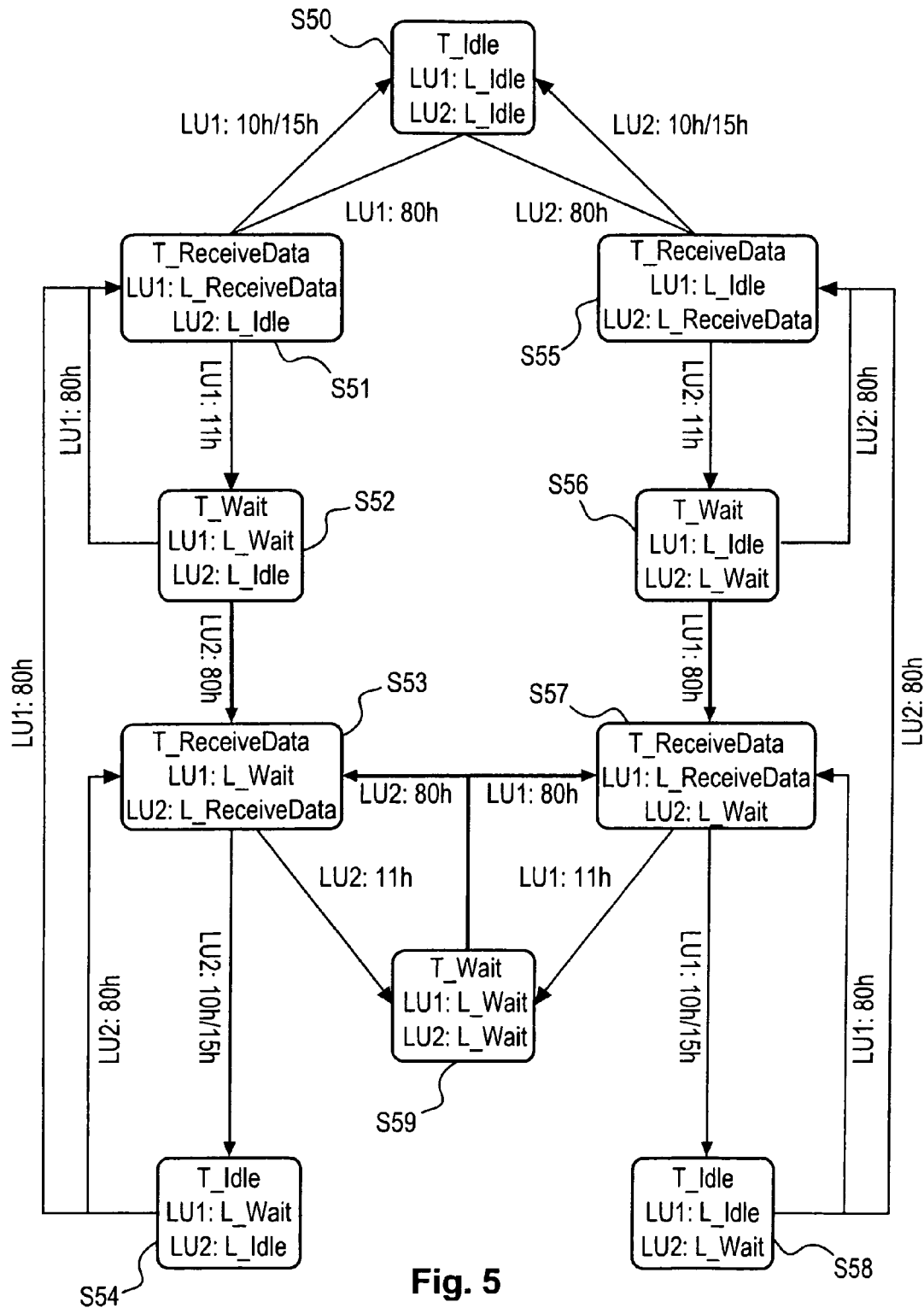
FIG. 5 depicts a state diagram of a solid state memory comprising one target and two logical units according to the invention

To illustrate the inventive method in more detail, FIG. 5 depicts a state diagram of a solid state memory comprising one target and two logical units according to the invention. Thus, the allowable combinations of target states and corresponding logical units LU1, LU2 are shown. It is understood, that the inventive method is also applicable for at least one target containing more than two logical units. Fore sake of simplicity, only states are illustrated in which page program commands or page cache program commands of the first cycle 80h or the second cycle 10h/15h or interleaved commands 11h are issued. It is understood that in order to switch from a first state to a second one of the target and of the respective LUN, the state switches according to FIG. 3 and FIG. 4 between the first and second state have also to be performed. The state switches are performed as described in the ONFI specification.

In the initial state S50, the target is in idle state T_Idle. The LUNs are as well in the idle states L_Idle. If a page program command of the first cycle 80h is received for LU1, state S51 is activated. Thus, the target is switched to T_PP_LUN_

DataWait and LU1 is switched to L_PP_WaitForData. LU2 has not changed its state. Accordingly, LU1 is now ready for receipt of data. After data receipt in LU1, it is checked if a page program 10h or page cache program 15h of the second cycle is issued. In this case, the data is programmed to a page of the first logical unit LU1 and the state machine switches back to idle state S50. If an interleaved command 11h for LU1 is issued, the target switches to T_PP_IlvWait and LU1 switches to L_PP_Ilv_Wait. LU2 stays in L_idle state. This corresponds to S52 of FIG. 5. Thus, further page program commands 80h of the first cycle can be issued either for logical unit LU1 or LU2. In case a page program command 80h is issued for LU1, the state machine switches back to state S51. In case a page program command 80h is issued for LU2, the state machine switches to S53. To issue a page program 80h command of the first cycle to a second logical unit, while an interleaved 11h command was issued to a first logical unit before, forms part of the inventive character of the method. The state transition is thus indicated by a bold arrow. The target is then waiting for new data or a new command from the host in state T_PP_LUN_DataWait, LU1 is waiting in state L_PP_IlvWait and LU2 is waiting for data to be received in state L_PP_WaitForData. As a consequence, LU1 is not reset to idle state before LU2 is switched to a state in which it waits for data. Thus, when switching to LU2 from LU1 according to the inventive method, data in the page registers from LU1 are not lost, which is one of the advantages of the inventive method.

State S53 is reached after a command of the first cycle was issued to LU2, thus in state S53 a page program command 10h, a page cache program command 15h or an interleaved command 11h of the second cycle dedicated to LU2 are allowable. Issuing a page program command 10h or page cache program command 15h dedicated to LU2 leads to T_Idle state of the target and L_Idle state of LU2. This corresponds to state S54 if FIG. 5. From state S54 a page program 80h or page cache program 80h command of the first cycle can be issued for LU1 or LU2. In case the 80h command is issued to LU1, the state machines switches to state S51. In case the 80h command is issued to LU2, the state machine switches to S53.

If an interleaved 11h command is issued to LU2 in state S53, the target switches to T_PP_IlvWait and LU2 switches to L_PP_IlvWait. As LU1 stays in L_PP_IlvWait, the state machine is in state S59 and is ready to receive the next request of the first cycle either for LU1 or LU2. In case the 80h command is issued to LU1, the state machine switches to state S57 for waiting for a command for LU1. Switching from state S59, which was reached after receiving an interleaved command for LU2, to state S57, in which the state machine waits for a page program command 10h, a page cache program command 15h or an interleaved command 11h of the second cycle dedicated to LU1 is part of the invention. The known way would be to receive a page program command 80h of the first cycle for LU1 in state S59, if state S59 was reached by an interleaved command 11h for LU2. The state machine would then switch back to state S53 for waiting for a command for LU2 as already described above.

States S55, S56, S57 and S58 and their state switches correspond to states S51, S52, S53 and S54 and their state switches, if the commands are issued correspondingly for the other logical unit. A detailed description is therefore omitted.

Thus, the program flow according to the invention uses the interleaved page program 11h to bring target and LUN to a state waiting for additional data T_PP_IlvWait and L_PP_IlvWait, respectively. This is the case in states S52, S56 and S59 according to FIG. 5. According to the invention, writing small data blocks of less than one page size to the page register of a fist logical unit, switching to another logical unit and continue writing to the page register of the fist logical unit after a switch back to the first logical unit was made, and then programming a complete page to the first logical unit is enabled.

The program flow to write data, e.g. of different data sources to different LUNs is as follows.

| Procedure | Target State | LUN State |
|---|---|---|
| Write Command 80h to NAND device | T_Idle<br>-> T_Cmd_Decode<br>-> T_PP_Execute<br>-> T_PP_AddrWait | L_Idle |
| Write LUN-, block- and page-address to NAND device | T_PP_AddrWait<br>-> T_PP_Addr<br>-> T_PP_LUN_Execute<br>-> T_PP_LUN_DataWait | L_Idle<br>-> L_Idle_TargetRequest<br>-> L_PP_Execute<br>-> L_PP_Addr<br>-> L_PP_WaitForData |
| Write data block of less than pagesize to NAND device | T_PP_LUN_DataWait<br>-> T_PP_LUN_DataPass<br>-> T_PP_LUN_DataWait | L_PP_WaitForData<br>-> L_PP_AcceptData<br>-> L_PP_WaitForData |
| Write Command 11h to NAND device | T_PP_LUN_DataWait<br>-> T_PP_Cmd_Pass<br>-> T_PP_IlvWait | L_PP_WaitForData<br>-> L_PP_Ilv<br>-> L_PP_Ilv_Wait |
| [ . . . write data to other logical units . . . ] | | |
| Write Command 80h* to NAND device | T_PP_IlvWait<br>-> T_PP_AddrWait | L_PP_Ilv_Wait |
| Write LUN-, block-, page- and column-address to NAND device | T_PP_AddrWait<br>-> T_PP_Addr<br>-> T_PP_LUN_Execute<br>-> T_PP_LUN_DataWait | L_PP_Ilv_Wait<br>-> L_PP_Addr<br>-> L_PP_WaitForData |
| Write additional data to NAND device, until full page has been written | T_PP_LUN_DataWait<br>-> T_PP_LUN_DataPass<br>-> T_PP_LUN_DataWait | L_PP_WaitForData<br>-> L_PP_AcceptData<br>-> L_PP_WaitForData |
| Write Command 10h to NAND device | T_PP_LUN_DataWait<br>-> T_PP_Cmd_Pass<br>-> T_Idle | L_PP_WaitForData<br>-> L_PP_Prog<br>-> L_PP_ProgWait<br>-> L_PP_Sts<br>-> L_Idle |

*The address cycles for the page program operation of state T_PP_IlvWait have the same interleaved block address as the one issued in the preceding page program operation, but the column address is incremented to place the further data blocks to the right position in page register.

What is claimed is:

1. A solid state memory for programming at least two data streams thereto, the solid state memory including:
   a target having at least two logical units, each logical unit having at least one page, wherein a page is programmed at one time, said target configured to store each of the at least two data streams in a different one of said at least two logical units to which a one of the at least two data streams is addressed;
   each logical unit including an internal buffer memory configured for temporarily storing the incoming data stream addressed to the associated one of the at least two logical units before the incoming data are programmed from the internal buffer memory associated with the logical unit to at least one page of the associated logical unit; and
   the internal buffer memory in each logical unit configured to be controlled to keep data which are not yet programmed to the associated logical unit when a switching operation to a different logical unit is performed; and
   said solid state memory including a controller unit for controlling the target and the at least two logical units, wherein the controller unit is configured:
   to check whether the internal buffer memory associated with an addressed one of the at least two logical units contains data for at least one complete page to be programmed into the associated logical unit;

when the check is positive, to program at least one page into an addressed one of the at least two logical units;

when a switching operation is performed between the different logical units of the at least two logical units, to keep the data, which has not yet been programmed into the addressed logical unit, in the internal buffer memory associated with the addressed one of the at least two logical units; and to set the target into state T_PP_LUN_DataWait and to set the logical units of the target into state L_PP_Wait-ForData, after programming a full page to the addressed one of the logical units, using the commands 10*h* or 15*h* in order to prevent the target from deleting the data from the internal buffer memory associated with the addressed one of the at least two logical units;

wherein the solid state memory is a NAND Flash device realized in accordance with an Open NAND Flash Interface (ONFI) specification, and wherein the states and commands defined herein comply with the ONFI specification.

2. The solid state memory according to claim 1, wherein:

each logical unit contains at least one block, which is the minimum erasable unit of the memory, and each block contains at least one page, which is the minimum programmable unit of the memory.

3. The solid state memory according to claim 1, wherein at least one of the internal buffers of the logical units has a minimum size for storing a whole page and the data received during the programming cycle of a page at highest allowable input bitrate.

4. The solid state memory according to claim 2, wherein at least one of the internal buffers of the logical units has a minimum size for storing a whole page and the data received during the programming cycle of a page at highest allowable input bitrate.

5. A camera system containing one or more cameras, wherein the camera system contains a solid state memory according to claim 1.

6. A camera system containing one or more cameras, wherein the camera system contains a solid state memory according to claim 3.

7. A camera system containing one or more cameras, wherein the camera system contains a solid state memory according to claim 4.

8. The camera system according to claim 5, wherein it contains at least two cameras and data streams captured by different cameras are stored in different logical units.

9. A method for programming at least two data streams to a solid state memory, the solid state memory comprising a target having at least two logical units, each logical unit comprising at least one page, a page being programmed at one time, the method comprising the steps:

sequentially inputting said at least two data streams into the solid state memory;

storing data from said at least two data streams associated to different logical units of the at least two logical units in internal buffer memories contained in the different logical units, wherein said storing comprises storing each of the at least two data streams in a different one of said at least two logical units to which a one of the at least two data streams is addressed, and wherein each of the at least two logical units includes its own internal buffer memory;

checking whether the internal buffer memory associated with an addressed one of the at least two logical units contains data for at least one complete page to be programmed into the associated logical unit;

if the checking step is positive, programming at least one page into an addressed one of the at least two logical units;

when a switching operation is performed between the different logical units of the at least two logical units, keeping the data, which has not yet been programmed into the addressed logical unit, in the internal buffer memory associated with the addressed one of the at least two logical units; and setting the target into state T_PP_LUN_DataWait and setting the logical units of the target into state L_PP_Wait-ForData, after programming a full page to the addressed one of the logical units, using the commands 10*h* or 15*h* in order to prevent the target from deleting the data from the internal buffer memory associated with the addressed one of the at least two logical units;

wherein the solid state memory is a NAND Flash device, wherein said method is performed in accordance with an Open NAND Flash Interface ONFI specification and wherein the states and commands defined herein comply with the ONFI specification.

10. The method according to claim 9, wherein the input data streams are captured by a camera system having different cameras.

11. The method according to claim 9, further comprising the steps of:

setting the target into state T_PP_Ilv_Wait and setting logical units into state L_PP_Ilv_Wait using the Page Program Interleaved command 11*h* after receiving the data in the data register;

keeping the target in state T_PP_Ilv_Wait and keeping the logical unit in state L_PP_Ilv_Wait until the data register of a logical unit number is filled with a full page; and programming these data to a page using the commands 10*h* or 15*h*.

12. The method according to claim 10, further comprising the steps of:

setting the target into state T_PP_Ilv_Wait and setting logical units into state L_PP_Ilv_Wait using the Page Program Interleaved command 11*h* after receiving the data in the data register;

keeping the target in state T_PP_Ilv_Wait and keeping the logical unit in state L_PP_Ilv_Wait until the data register of a logical unit number is filled with a full page; and programming these data to a page using the commands 10*h* or 15*h*.

* * * * *